United States Patent Office 3,555,930
Patented Jan. 19, 1971

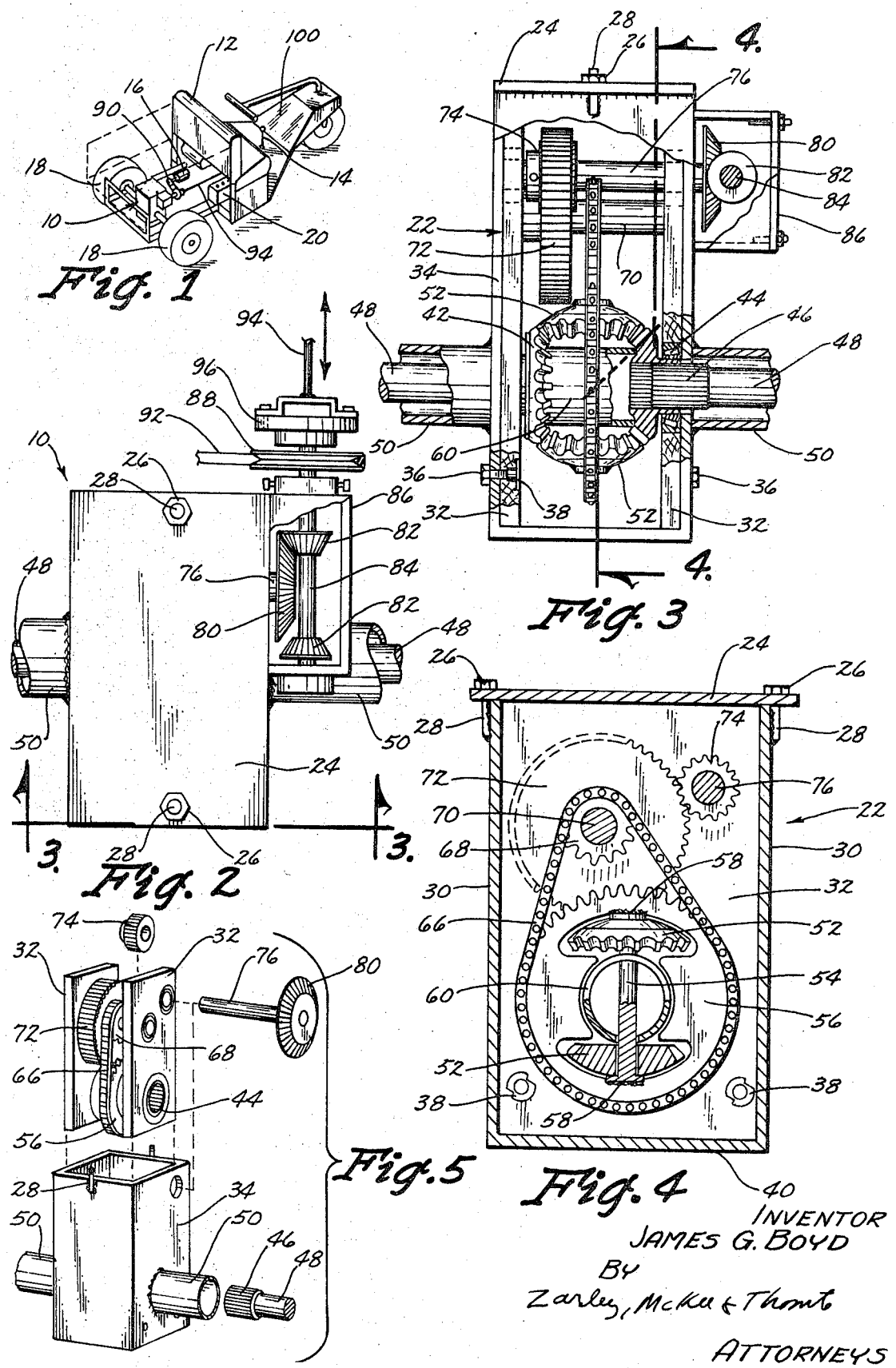

3,555,930
TRANSMISSION UNIT
James G. Boyd, 960 17th St. NE.,
Mason City, Iowa 50401
Filed Feb. 26, 1969, Ser. No. 802,564
Int. Cl. F16h 1/40
U.S. Cl. 74—713                                                8 Claims

ABSTRACT OF THE DISCLOSURE

A transmission and differential mounted on a pair of nonmetallic support plates removably received within a housing having side walls in mating engagement with the plates. Two pairs of beveled gears are provided and a sprocket gear embraces one pair of bevel gears about their common axis of rotation is in turn connected to a power source through a reverse gear arrangement. The other pair of bevel gears are connected with output wheel shafts.

---

Golf cars and other small motorized vehicles are commonly available but require complicated specialized gear trains for connecting the power source to the drive engaging wheels.

The transmission differential of this invention may be easily assembled with a minimum number of parts and may be easily worked on if maintenance is required. The gears are supported on lightweight but yet structurally strong fiberboards as opposed to metal plates and then the unit is dropped into a housing filled with a lubricant if desired. A pair of oppositely disposed wheel drive shafts are inserted into opposite sides of the housing into engagement with a pair of oppositely facing spur gears engaging another pair of spur gears embraced by a sprocket gear connected to a gear reduction shaft in turn connected through a reversing gear to the power source such as an electric motor.

The gear unit provides the usual differential functions allowing the individual drive wheels to turn independently such that the vehicle may turn corners easily and additionally is connected directly to the power means through a sprocket chain engaging the sprocket wheel mounted on the one pair of oppositely facing bevel gears. A spacer sleeve is disposed between the other pair of bevel gears.

The reversing gear includes a drive bevel gear disposed between oppositely facing bevel gears mounted on a shaft which is adapted to be moved by a gear shift lever to place alternately one or the other of the movable bevel gears into enagement with the drive bevel gear.

It is intended that the transmission unit of this invention may be assembled by the purchaser of the transmission unit either from components provided by the manufacturer or by following instructions in putting the unit together with component parts readily available.

These and other features and advantages of this invention will become readily apparent to those skilled in the art upon reference to the following description when taken into consideration with the accompanying drawings, wherein:

FIG. 1 is a perspective view of a golf cart including the transmission unit of this invention:

FIG. 2 is a top plan view of the transmission unit;

FIG. 3 is a cross-sectional view taken along line 3—3 in FIG. 2;

FIG. 4 is a cross-sectional view taken along lines 4—4 in FIG. 3; and

FIG. 5 is an exploded view of the transmission unit.

The transmission unit of this invention is referred to generally in FIG. 1 by the reference numeral 10 and is shown in use on a golf cart 12 having a gear shift lever 14 for controlling the operation of the transmission unit 10. A motor 16 drives ground engaging support wheels 18 through the transmission unit 10 as will be hereinafter described in greater detail. A battery 20 is provided for powering the electric motor 16. It is understood that an internal combustion engine could be alternatively used and that the transmission unit could be employed on any type of small vehicle.

As seen in FIG. 3, a housing 22 rectangular in cross-section is provided and has a removable cover plate 24 held in place by nuts 26 on upstanding bolts 28 welded to the opposite side walls 30.

A pair of transmission support plates 32 of nonmetallic material such as fiberboard or the like are matingly received inside the housing 22 and are positioned against the opposite housing side walls 34. A pair of bolts 36 extend through the oppositely disposed housing side walls 34 and are anchored in metal threaded insert sleeves 38 in the support plates 32 as seen in FIG. 3. The bottom edges of the support plates 32 matingly engage the housing bottom wall 40 and thus the plates are firmly held in place within the housing 22 but may be easily removed by removing the bolts 36.

The first set of oppositely disposed bevel gears 42 are disposed on a common axis and are rotatably mounted in bearings 44 mounted in the support plates 32. The interior wall of the bevel gears 42 are provided with internal splines for mating engagement with male splined end portions 46 on wheel output drive shafts 48 connected to the drive wheels 18. An axle housing sleeve 50 is welded to the exterior of the opposite housing side walls 34.

As seen in FIG. 4, a second set of bevel gears 52 are in engagement with the first set of bevel gears 42 and are rotatably mounted on a pin 54 having its external ends welded to the inner side of a sprocket gear 56 as seen by the weldments 58. A spacer sleeve 60 extends between the first pair of bevel gears 42 and keeps them in spaced relationship and prevents binding on the second set of bevel gears 52. The pin 54 extends through the sleeve 60 and the bevel gears 42 are free to rotate independently of the sleeve.

A drive sprocket chain 66 extends around the drive sprocket 56 and engages a sprocket gear 68 carried on a shaft 70 which also carries a larger spur gear 72 in engagement with a smaller spur gear 74 mounted on a shaft extending between the support plates 32 and outwardly through the housing side wall 34 where a bevel gear 80 is provided and is adapted to engage one or the other of a pair of bevel gears 82 carried on a movable shaft 84. The shaft 84 then extends outwardly of an auxiliary housing 86 in which the three gears 80 and 82 are enclosed. A V-belt pulley 88 is carried on the shaft 84 and engages the drive pulley 90 of the motor 16 through a V-belt 92. A gear linkage member 94 is connected to the shaft 84 through a thrust type connection 96 to permit movement of the bevel gears 82 alternately into engagement with the bevel gear 80 to reverse the direction of operation of the drive wheels 18. The gear shift lever 14 is connected to the gear linkage member 94 and thus the forward and rearward positions of the transmission may be selected from the driver station 100 by the operator.

Thus it is seen that a simplified transmission and differential have been provided for a golf cart like vehicle which may be operated either forwardly or rearwardly. The transmission may be quickly assembled or disassembled from readily available component parts all of which are carried on nonmetallic lightweight fiberboard support plates 32 mounted in a rectangular in shape housing 22 secured to the axles sleeves 50 of the vehicle. The chain sprocket 56 connected to the pair of bevel gears 52 provides a unique connection to the drive shaft 70 in turn connected through the reduction gears 72 and 74 to the electric motor 16. Moreover, the forward and rearward gear positions may be easily obtained by merely moving the shaft 84 in either direction as indicated by the double headed arrow in FIG. 2 to place the appropriate bevel gear 82 in engagement with the center bevel gear 80.

Motor driven carts would not require the reverse gear since they would be reversed by reversing the polarity of the motor through operation of a forward and reverse control switch.

Some changes may be made in the construction and arrangement of my transmission unit without departing from the real spirit and purpose of my invention, and it is my intention to cover by my claims, any modified forms of structure or use of mechanical equivalents which may be reasonably included within their scope.

I claim:
1. A transmission unit, comprising:
   a transmission housing,
   gear means in said housing adapted to engage an input drive shaft and at least one output drive shaft,
   a pair of parallel nonmetallic plates disposed on opposite sides of said gear means and removably received in said housing, said gear means being carried on said pair of plates, said housing having a bottom wall, four upstanding side walls and a removable top wall providing access into said housing and said pair of plates being in mating engagement with a pair of said housing side walls,
   and a wheel output shaft extending from opposite sides of said housing and adapted to be coupled to vehicle drive wheels.
2. The structure of claim 1 wherein said gear means includes two pairs of bevel gears in engagement to provide a differential gear means, one pair of bevel gears being positioned in and secured to a drive gear.
3. The structure of claim 2 wherein an input drive shaft extends into said housing and is coupled to said drive gear, a pair of bevel gears are disposed on opposite sides of a drive bevel gear carried on said input drive shaft, gear shift means connected to a shaft carrying said pair of bevel gears and the spacing therebetween being sufficient to permit said shaft to be moved back and forth to alternately place one of said bevel gears in engagement with said drive bevel gear and thereby provide forward and rearward power output at said output drive shafts.
4. The structure of claim 2 wherein said one set of bevel gears has an axis of rotation extending through the center axis of rotation of said drive gear and in the plane of said drive gear, and the axis of rotation of said drive gear extends between the bevel gears in said one set of spur gears at the midpoint therebetween.
5. The structure of claim 4 wherein said drive gear is adapted to be engaged around its outer periphery by a drive means.
6. The structure of claim 5 wherein the outer periphery of said drive gear is provided with teeth.
7. The structure of claim 6 wherein said one set of bevel gears is rotatable on pin means and said pin means is rigidly secured to said drive gear.
8. The structure of claim 7 wherein said pin means extends between and through the bevel gears of said one set of bevel gears and a spacer sleeve means extends between the other set of spur gears, and said pin means extends through said spacer sleeve.

References Cited
UNITED STATES PATENTS

| | | | |
|---|---|---|---|
| 434,624 | 8/1890 | Brown | 74—713X |
| 907,181 | 12/1908 | Schlig | 74—700 |
| 1,200,873 | 10/1916 | Rosenberger | 74—710 |
| 1,406,209 | 2/1922 | Murnane | 74—700X |
| 1,420,995 | 6/1922 | Foote et al. | 74—701 |
| 2,608,261 | 8/1952 | Blazier | 74—713X |
| 3,073,176 | 1/1963 | Daugirdas | 74—606X |

FOREIGN PATENTS

| | | | |
|---|---|---|---|
| 581,789 | 9/1958 | Italy | 74—713 |

CARLTON R. CROYLE, Primary Examiner

T. C. PERRY, Assistant Examiner

U.S. Cl. X.R.

74—701